United States Patent [19]

Ponce

[11] Patent Number: 4,799,658

[45] Date of Patent: Jan. 24, 1989

[54] DOOR HOLDER AND ELECTRICAL CARPENTER'S AID

[76] Inventor: Felix C. Ponce, 6725 Bovey Ave., Reseda, Calif. 91335

[21] Appl. No.: 107,907

[22] Filed: Oct. 13, 1987

Related U.S. Application Data

[63] Continuation of Ser. No. 798,888, Nov. 18, 1985, abandoned.

[51] Int. Cl.⁴ ................................................ B23Q 3/02

[52] U.S. Cl. ................................ 269/133; 269/254 R; 269/310

[58] Field of Search ................... 269/133, 254 R, 137, 269/139, 143, 310; 211/26

[56] References Cited

U.S. PATENT DOCUMENTS

| | | | |
|---|---|---|---|
| 849,354 | 4/1907 | Adams | 269/224 |
| 1,429,788 | 9/1922 | Soliah | 269/133 |
| 2,830,632 | 4/1958 | LaRouche | 269/139 |
| 2,971,548 | 2/1961 | House | 269/133 |
| 3,450,454 | 6/1969 | Anders | 211/26 |

*Primary Examiner*—Frederick R. Schmidt
*Assistant Examiner*—Judy J. Hartman
*Attorney, Agent, or Firm*—Lewis B. Sternfels

[57] ABSTRACT

A clamp (16) has movable and fixed ledges (58, 82) extending forwardly towards one another from posts (38, 40) on the clamp's halves (34, 36). The movable ledge receives a door whose weight moves the ledge in a generally gravitaionally downward direction to move post (38) towards post (40) and to clamp the work piece therebetween. The fixed ledge is positioned in the path of movement of the door and the movable ledge to limit the movement and any excessive pressure which otherwise might be exerted on the door by the clamp halves. The clamp is mounted on a base (14) which comprises angled piping (20, 22) to form a two-dimensional support for the clamp and the door. Insulated electrical wires (22) extend through the piping. Sockets (26) are secured at one or more ends (24) of the piping, save for one, to provide electrical outlet connections for power tools. The insulated wire extends from the remaining piping end (32) for connection to a conventional electrical outlet.

12 Claims, 3 Drawing Sheets

DOOR HOLDER AND ELECTRICAL CARPENTER'S AID

This is a continuation of Ser. No. 798,888 filed Nov. 18, 1985, now abandoned.

BACKGROUND OF THE INVENTION

1. Field of the Invention

The present invention relates to a clamping device for erect holding of thin work pieces and, in particular, to such a clamping device for enabling support of doors and the like on their edges and for making electrical outlets safely and conveniently available to enable carpentry work to be performed on such work pieces.

2. Description of the Prior Art

Recurring problems, which arise particularly in carpentry work, include the need to support work pieces, such as doors and sashes, on their edges so that work may be performed on them while they are held in a generally upright position and, in addition, to provide safe and easy access to electrical outlets so that power-operated tools may be used.

Many devices have been devised to address the former problem, and may be grouped into three catagories. The first is illustrated by U.S. Pat. Nos. 771,753, 849,354, 1,067,667 and 1,606,634, in which the door is simply clamped between a pair of jaws by moving them manually or with the aid of a screw mechanism into contact with the sides of the door followed by, if necessary, use of wing nuts to affix them in position. The second catagory is represented by U.S. Pat. Nos. 611,340, 848,837, 1,042,232, 1,138,088, 2,605,795 and 2,830,632, where the weight of the door brings the jaws into clamping contact with the sides of the door. The third includes U.S. Pat. Nos. 708,238 and 4,391,437, which employ a hook or a lever to close the jaws on the door. All these devices have one or more of the following shortcomings. Some require considerable manual effort in the clamping or unclamping operations. Others comprise a complex number of constituent parts which may be subject to malfunction or breakage, for example, by the weight of the work piece. In some cases, its weight might cause it to be jammed between the jaws and thereby to cause excessive squeezing of or injury to the door and possible indenting or marring of its sides and to prevent its facile removal from the device. Still others need to be supported on a substantially flat surface as a condition for enabling their operability.

With respect to the latter safety problem, it is conventional to extend a long extension electrical cable from an electrical outlet and, when one tool is to be used in place of another, the last used tool is unplugged and the new tool is connected to the cable in its place. In an alternate approach, a plurality of tools are plugged into a multiple female plug at the end of the cable extension or a jumble of electrical cords are extended to the outlet. Regardless of the particular set-up, all have safety hazards, either in exposing the user to electrical or physical harm. Merely having a plurality of electrical cords in the work area presents the possibility of injury to him should he trip and fall if his feet become entangled with even one cord. A plurality of cords also increases the likelihood of electrical shock.

SUMMARY OF THE INVENTION

The present invention avoids or overcomes these and other problems by the preferred construction in which a clamp is secured atop a base. The clamp includes first and second surfaces spaced from one another define an entry for receiving the work piece. A movable connection between the first and second surfaces enables them to be opened and closed. A ledge positioned in the entry is coupled to the first surface for receiving the work piece and for enabling its weight to move the ledge and the first surface in a generally gravitationally downward direction and thereby to move the first surface towards the second surface and to clamp the work piece therebetween. A second ledge in the entry is affixed to the second surface and positioned in the path of movement of the work piece and the first ledge to limit the movement.

The base comprises angled piping which thereby forms a two-dimensional support for the clamp and the work piece. The piping is of tubular construction to provide a housing through which insulated electrical wires are extended. Female plugs are secured at one or more ends of the piping, save for one, to provide electrical outlet connections for power tools. The insulated wire extends from the remaining piping end for connection to a conventional electrical outlet.

Several advantages are obtained from this preferred construction. Damage to the door is minimized. A small number of working parts may be employed, while ensuring electrical and other personal safety of the user. The cost and weight can be reduced.

Other aims and advantages, as well as a more complete understanding of the present invention, will appear from the following explanation of exemplary embodiments and the accompanying drawings thereof.

DETAILED DESCRIPTION OF THE INVENTION

Figure 1:
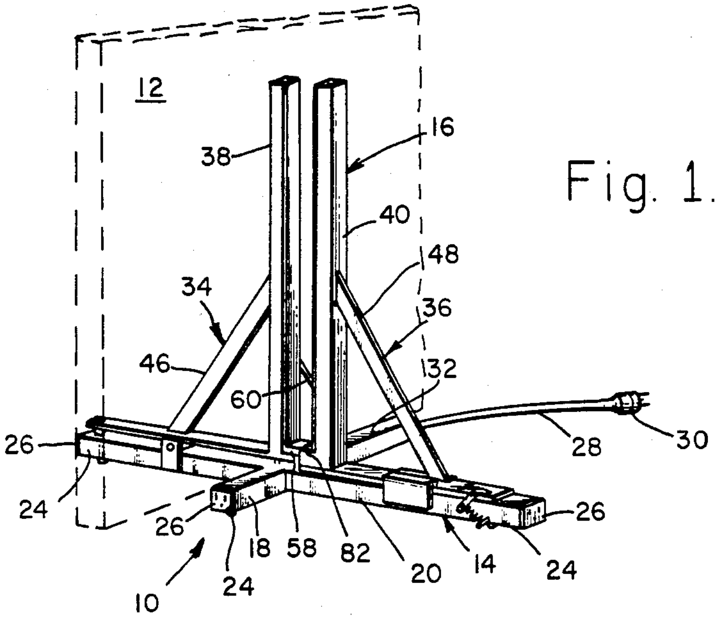
FIG. 1 is a perspective view of a first embodiment of the present invention.
Figure 2:
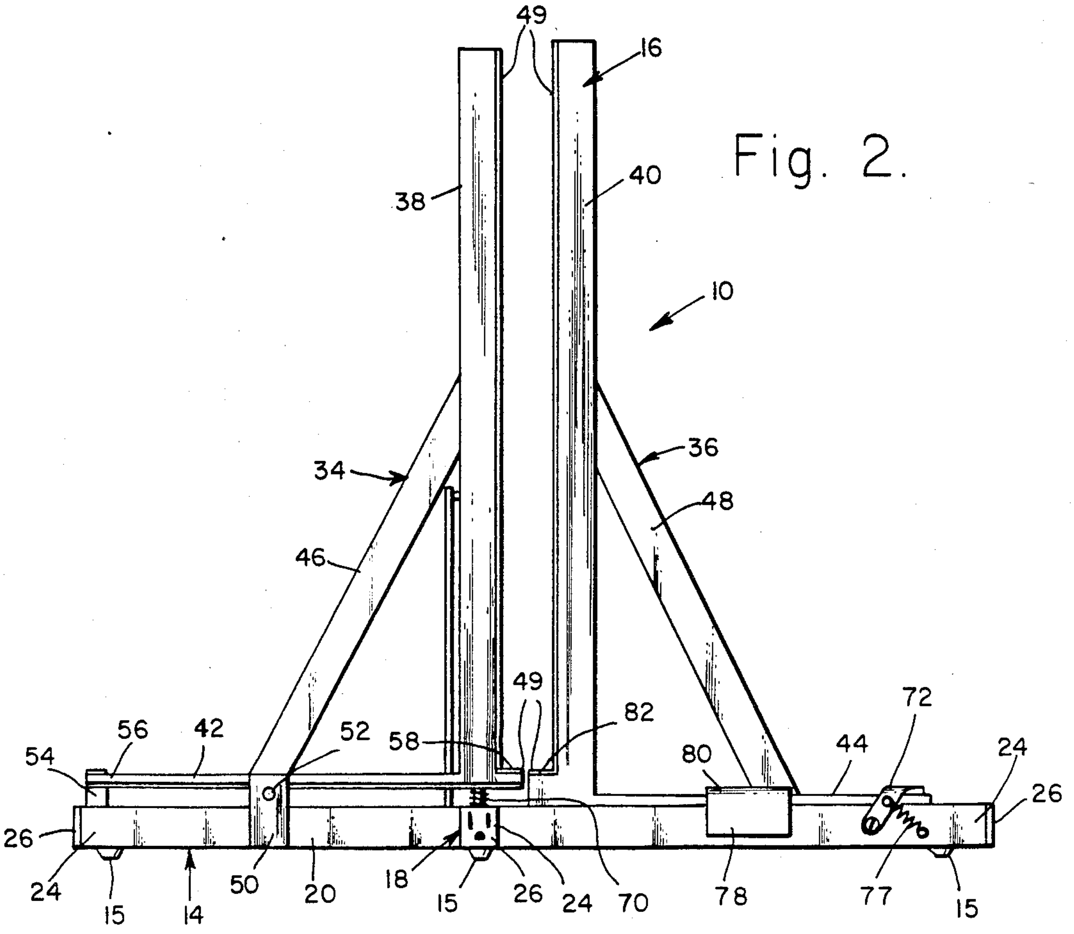
FIG. 2 is a front elevational view thereof.
Figure 3:
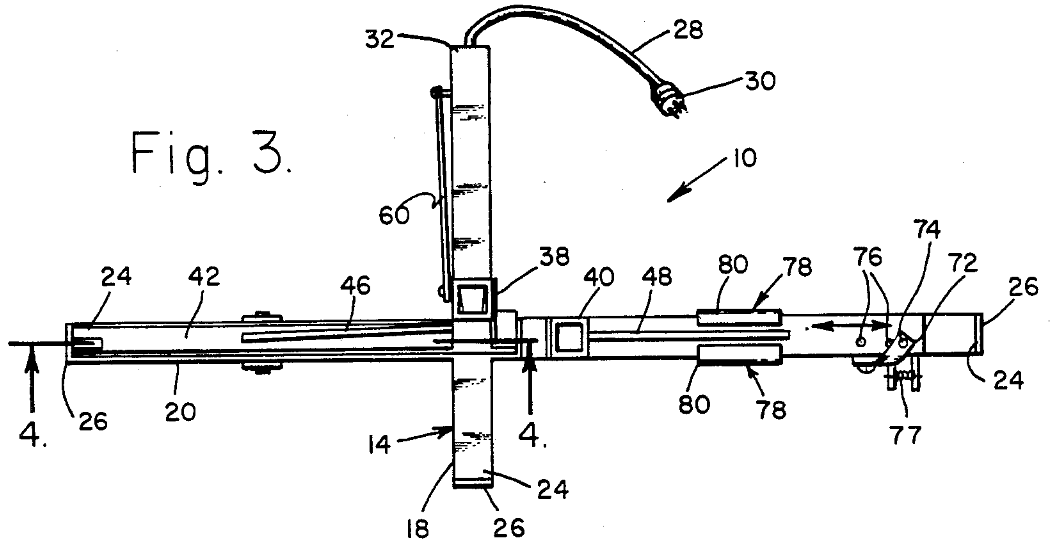
FIG. 3 is a top plan view thereof.
Figure 4:
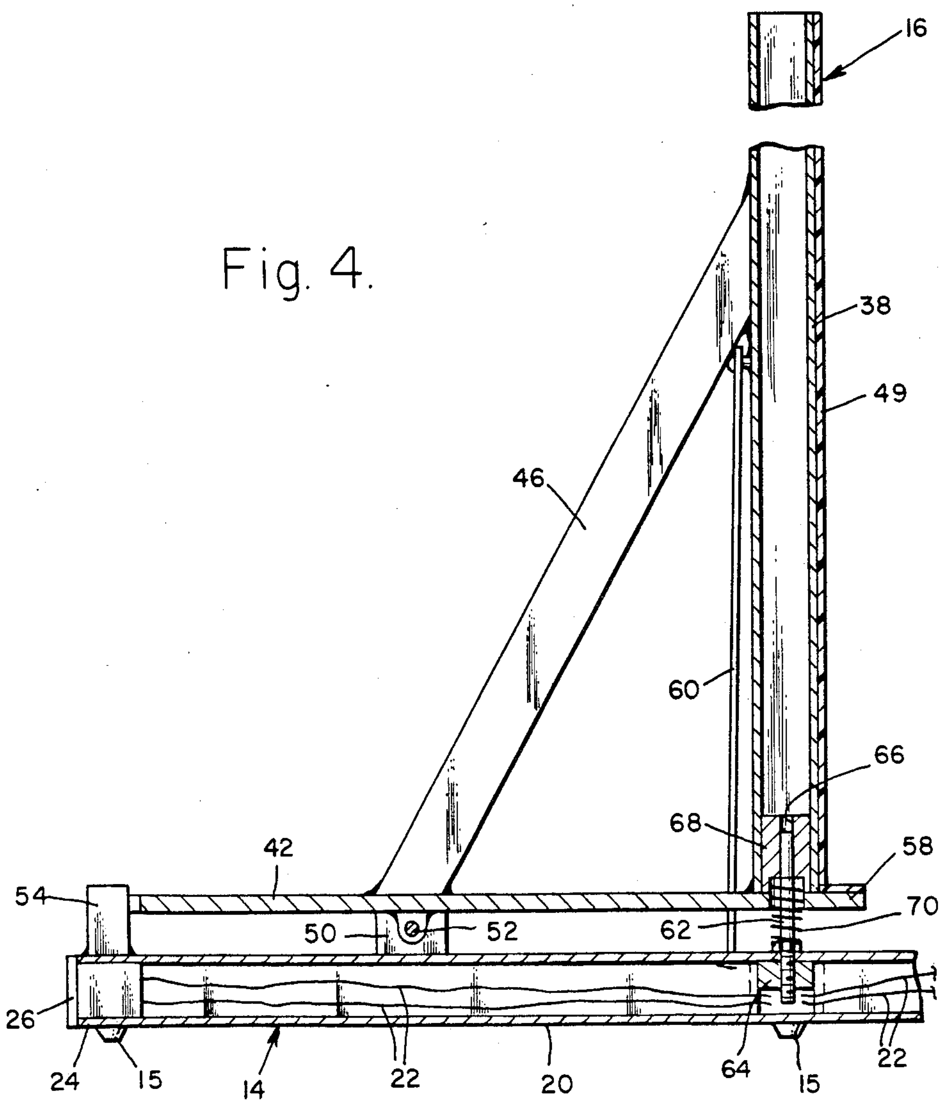
FIG. 4 is a side view in partial cross-section of the first embodiment.

In FIGS. 1–4, a carpenter's door holder and electrical aid 10 is shown resting on a floor or on the ground, with a door 12 or other work piece, depicted in phantom, edge supported in the aid. Aid 10 includes a base 14 onto which a clamp 16 is secured. Feet 15 are secured to the bottom of the base at its center and ends to protect a floor or other surface upon which the base may be placed. The base is formed, for example, from at least two tubes or pipes 18 and 20 integrally secured together, e.g., in a perpendicularly crossed configuration. The crossed tubes are in the same general plane and thereby provide a two-dimensional support for clamp 16 and door 12. The hollow interiors of the tubes interconnect to form, as illustrated in FIG. 4, a continuous conduit for electrical cables 22 of insulated electrical conductors. Three of the four ends 24 of tubes 18 and 20 are terminated by sockets 26 which receive the plugs of electrically powered tools to be used with the aid. A cable 28 with its plug 30 extends from the fourth tube end 32, and plug 30 is adapted to fit into a conventional building electrical outlet.

Clamp 16 comprises halves 34 and 36, respectively including upstanding posts 38 and 40, legs 42 and 44 generally perpendicular to their respective posts, and braces 46 and 48 affixed to their posts and legs. Padding 49 of soft material is placed on all portions of the posts which come into contact with the door to protect its surfaces from scratches and other harm. A pivot 50 is secured to and extends above base 14, and is coupled to leg 42 of clamp half 34 by a pin 52 so that clamp half 34 is rockable on the base. To ensure the greatest rigidity of clamp half 34 and to prevent bending of its leg 42, brace 46 is secured to leg 42 at a point above pivot pin 52. A pair of spaced guiding fingers 54 secured to the base are placed on either side of an end 56 to prevent side-to-side movement of clamp half 34 with respect to the base. A ledge 58 extends oppositely from the other end of leg 42, and projects beyond post 38. Ledge 58 is adapted to form a rest for door 12 and has a portion of padding 49 attached thereto.

To prevent other side-to-side movement of clamp half 34 with respect to base 14 and, therefore, to provide for its further support, a rod 60 is secured between tube end 32 and an upper portion of post 38.

As best shown in FIG. 4, a guide pin 62 is secured to tube 20 of the base, such as by a threaded connection with a nut 64, and extends upwardly from the base for engagement in a cooperating hole 66 of an insert 68. The insert is secured within the lower end of post 38. A spring 70 surrounds pin 62 and extends between the bottom of post 38 and tube 20, to urge post 38 and its ledge away from the base.

Leg 44 of clamp half 36 is in full sliding contact with base tube 20 and is adjustably secured thereto by a spring-loaded latch 72. As shown in FIG. 3, the latching engagement comprises a pin 74 in the latch, which is selectively positionable in and engageble with one of holes 76 adjacent end 24 of tube 20 and which is resiliently held in its engagement by a spring 77 secured between latch 72 and base 14. A pair of arms 78, affixed to tube 20 and straddling leg 44, have upper portions 80 which are bent over leg 44 to secure it in a slidable engagement with the base. A ledge 82 with a further portion of padding 49 thereon is adjacent post 40 of clamp half 36 and provides a stop to the downward movement of door 12.

In operation, clamp half 36 is adjusted with respect to its mating clamp half 38 by appropriate engagement of pin 74 of latch 72 in one of holes 76, so that the spacing between the clamp halves approximates the thickness of door 12. The door is then placed within aid 10, between halves 34 and 36 and on ledge 58, so that its weight causes clamp half 34 to pivot about pin 52 and against the bias of spring 70. Gravitationally downward movement of the door and the pivoting of clamp half 34 is arrested by contact with stop ledge 82, at which point posts 38 and 40 grip the sides of the door but without excessive force because ledge 82 prevents overtravel of clamp half and its post 38 with respect to mating clamp half 40 and its post 40, and the preset adjustment of clamp half 36 with respect to base 14. Carpentry work is then performed, including the use of electrically-powered tools which are selectively plugged into sockets 26. After completion of the work, the door is easily removed from aid 10.

Figure 5:
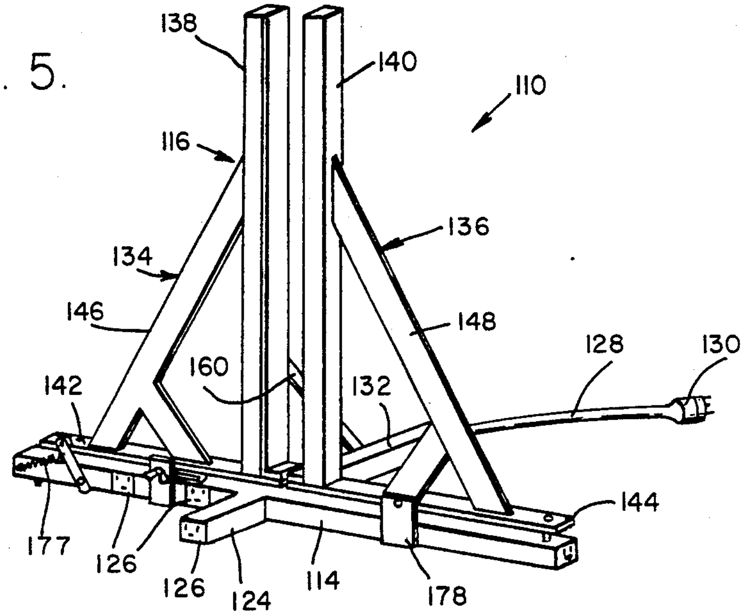
FIG. 5 is a perspective view of a second embodiment of the present invention.
Figure 6:
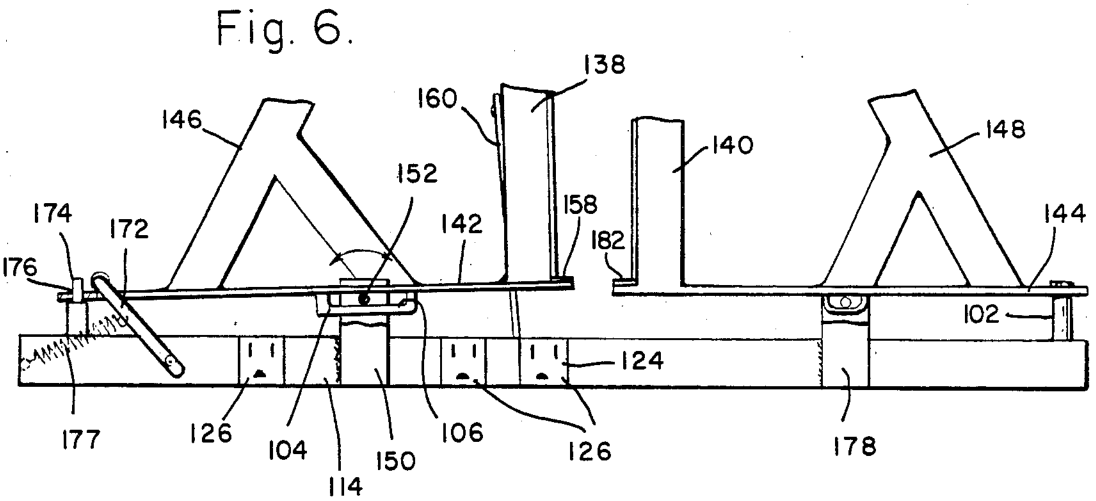
FIG. 6 is a partial front view, partly in section, of the embodiment depicted in FIG. 5.
Figure 7:
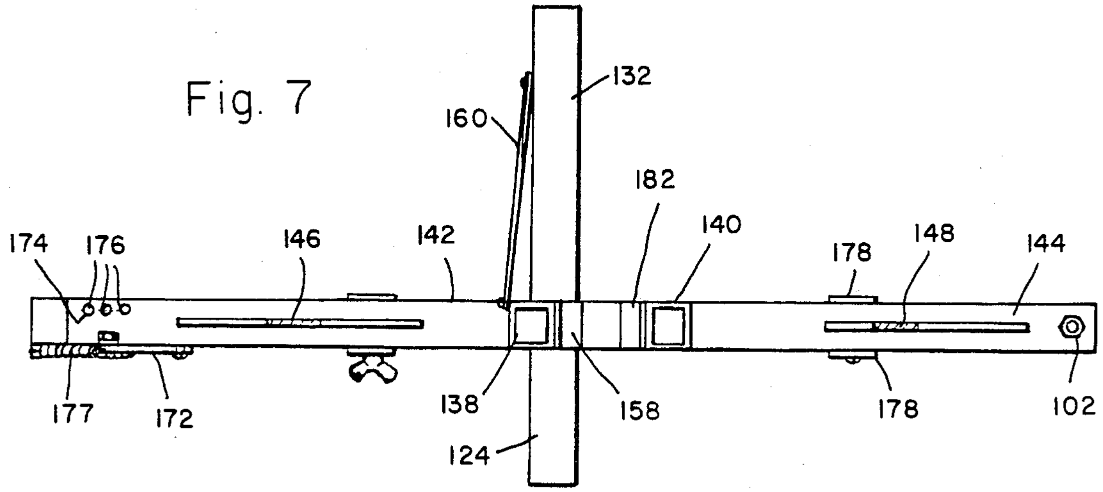
FIG. 7 is a top view, partly in section, of the device illustrated in FIG. 6.

FIGS. 5-7 illustrate a modification of the embodiment shown in FIGS. 1-4, in which similar parts are identified generally or in a generally functionally equivalent manner by corresponding indicia, but in a "100" series. Here, in an aid 110, a base 114 supports a clamp 116 which includes halves 134 and 136 having respective legs 142 and 144 and rigidifying braces 146 and 148. A rod 160, secured between tube end 132 and post 138, additionally supports clamp half 134 from falling on its side. Half 136 is affixed to base 114 by a bolt and post connection 102 and a post and pin connection 178 between the respective ends and intermediate portions of leg 144 and the base. A stop ledge terminates half 136 in front of post 140.

Clamp half 134 is both pivotable and adjustable with respect to base 114 and, like the first embodiment, has a door receiving ledge 158 extending forwardly of its post 138 towards ledge 182 of mating half 136. To provide the adjustment for the spacing between the posts, post 138 is linearly movable towards and away from mating post 140. A pivot support 150 is secured to and extends upwardly from base 114, and terminates in a pivot pin 152. A bracket 104 having an elongated slot 106 is secured to leg 142, with pivot pin 152 positioned within the slot. To fix the post to-post spacing adjustment in place, another pin 174 extends from the base and is disposed to engage one of holes 176 at one end of leg 142. Pin 174 is sufficiently long so that it remains within its selected hole 176 during pivoting of half 134 about pivot pin 152. A lever 172 under the tension of a spring 177 biases the leg and pin 174 into their engagement and, simultaneously, maintains ledge 158 in an upward position for reception of a door.

Operation of this latter embodiment is similar to that of the former. The spacing between the posts is adjusted and then set in accordance with the door to be worked on. The door is then positioned within aid 110 on ledge 158 and the door's weight pivots clamp half 134 against the bias of spring 177 acting through its lever 172. Gravitationally downward movement of the door and pivoting of clamp half 134 is stopped by ledge 182, thereby to limit pressing of the posts on the door. Electrical 20 power to tools is provided by insulated wires extending through the interior of the tubular base from a plug 130 and a cable 128 to sockets 126 in and between ends 124, in a manner similar to that described with respect to FIGS. 1-4.

Although the invention has been described with reference to particular embodiments thereof, it should be realized that various changes and modifications may be made therein without departing from the spirit and scope of the invention.

What is claimed is:

1. For uprightly supporting an item, having large area sides and a relatively small thickness between the sides, by a clamp supported on a hose and having first and second surfaces spaced form one another to define an entry for reception of the item, means for defining a movable connection between said first and second surfaces to enable respective opening and closing movements therebetween, and means positioned in said entry and coupled to said first surface for receiving the item and for enabling its weight to move the receiving means in a generally gravitationally downward path and thereby to move said first surface towards and second surface and to claim the item therebetween under increasing pressure thereon, the improvement comprising:

ledge means in said entry affixed to said second surface and positioned in the path of movement of the item and its receiving means for stopping the movement and for limiting the amount of the increasing clamping pressure by said surfaces against the item.

2. The improvement according to claim in which said comprising a base has an affixed connection to said ledge means and further comprising articulating means coupled to said receiving means for enabling the movement.

3. The improvement according to claim 1 further comprising biasing means coupled to said first surface for biasing said entry means gravitationally upwardly from said ledge means.

4. The improvement according to claim 3 in which said a base has an affixed connection to said ledge means and further comprising articulating means coupled to said receiving means for enabling the movement, and adjustment means coupled between one of said surfaces and said base for adjusting the space between said surface and for thereafter maintaining the adjusted space constant.

5. The improvement according to claim 4 in which said biasing means is coupled to said adjustment space constant.

6. The improvement according to claim 4 further comprising a guide pin extending from said base and into engagement with said first surface, said biasing means comprising à spring housed about said pin and positioned between said first surface and said base.

7. The improvement according to claim 1 in which said means coupled to said first surface comprises a ledge which is positioned in a plane and which is movable with said movable connection means until the plane comes into coplanar position with that of said ledge means when the movement is stopped.

8. The improvement according to claim 1 further comprising means pivoting said first surface to said base, and means coupled between said first surface and said base for preventing movements other than the pivoting movement.

9. The improvement according to claim 8 wherein said clamp includes a pair of posts on which said surfaces are respectively placed, a leg perpendicularly secured to said post having said first surface, and wherein said preventing means includes a guide secured to said base and slidably coupled with respect to said leg.

10. The improvement according to claim 10 wherein said base includes crossing tubes with said leg residing parallel to a first of said tubes and said guide being affixed to said first tube, and said preventing means further including a link coupled to a second of said tubes and said post having said first surface.

11. The improvement according to claim 1 further comprising a base and means defining a pivot between said first surface and said base and wherein said clamp includes a pair of posts on which said surfaces are respectively placed, a leg perpendicularly secured to said post having said first surface, and a brace extending between and attached to said first surface post and said leg and having its point of attachment to said leg positioned at said pivot point.

12. In a carpenter's aid, for uprightly supporting an item, having large area sides and a relatively small thickness between the sides, by a clamp supported on a base and having first and second surface spaced from one another to define an entry for reception of the item, means for defining a movable connection between said first and second surfaces to enable respective opening and closing movements therebetween, and means positioned in said entry and coupled to said first surface for receiving the item and for enabling its weight to move the receiving means in a generally gravitationally downward direction and thereby to move said first surface towards said second surface and to clamp the item therebetween under pressure, the improvement comprising a ledge in said entry affixed to said second surface and positioned in the path of movement of the item and its receiving means to stop the movement and to limit the clamping pressure by said surfaces against the item, and in which said base comprises tubes having through passageways an affixed connection to said leg and articulating means coupled to said receiving means for enabling the movement, and electrical wiring extending through the passageways of said tubes, and an electrical plug and at least one electrical socket terminating said wiring and respectively extending from and terminating the passageways of said tubes, said base thereby acting both as a support for the carpenter's aid and as an electrical conduit for said electrical wires.

* * * * *